(12) United States Patent
Weick et al.

(10) Patent No.: US 9,784,390 B2
(45) Date of Patent: Oct. 10, 2017

(54) SCREW CONNECTION DEVICE FOR CONNECTING THE FLARED ENDS OF TWO PIPES

(71) Applicant: TI Automotive (Heidelberg) GmbH, Heidelberg (DE)

(72) Inventors: Georg Weick, Plankstadt (DE); Sebastian Abbott, Heidelberg (DE); Andreas Stahn, Rauenberg (DE)

(73) Assignee: TI AUTOMOTIVE (HEIDELBERG) GMBH, Heidelberg (DE)

( * ) Notice: Subject to any disclaimer, the term of this patent is extended or adjusted under 35 U.S.C. 154(b) by 595 days.

(21) Appl. No.: 13/849,247

(22) Filed: Mar. 22, 2013

(65) Prior Publication Data

US 2014/0125056 A1    May 8, 2014

(30) Foreign Application Priority Data

Mar. 23, 2012   (DE) .................... 20 2012 101 058 U

(51) Int. Cl.
| | |
|---|---|
| *F16L 19/028* | (2006.01) |
| *F16L 19/02* | (2006.01) |
| *B60T 17/04* | (2006.01) |
| *F02M 55/00* | (2006.01) |

(52) U.S. Cl.
CPC ........ *F16L 19/0286* (2013.01); *B60T 17/043* (2013.01); *F02M 55/005* (2013.01); *F16L 19/0218* (2013.01); *F16L 19/0283* (2013.01)

(58) Field of Classification Search
CPC ............... F16L 19/0283; F16L 19/0286; F16L 19/0218; B60T 17/043; F02M 55/005
See application file for complete search history.

(56) References Cited

U.S. PATENT DOCUMENTS

| 431,816 | A | | 7/1890 | Lomasney | |
|---|---|---|---|---|---|
| 595,437 | A | * | 12/1897 | Greenfield | ...................... 285/53 |
| 2,189,556 | A | | 2/1940 | Kreidel | |
| 2,189,566 | A | | 2/1940 | Kreidel | |
| 3,172,934 | A | * | 3/1965 | Krieg | ............................ 264/263 |
| 3,489,435 | A | * | 1/1970 | Olson et al. | .................... 285/13 |

(Continued)

FOREIGN PATENT DOCUMENTS

| DE | 4425827 | 12/1995 | |
|---|---|---|---|
| DE | 102006036862 A1 * | 2/2008 | ........... F02M 55/005 |

(Continued)

*Primary Examiner* — James M Hewitt
(74) *Attorney, Agent, or Firm* — Brinks Gilson & Lione

(57) ABSTRACT

A screw connection device for connecting two pipes with flared ends, comprises a screw, a nut and a spacer. The nut has a front end aperture from which an accommodating space extends to a rear end aperture in a rear end wall. A surface of the nut in the accommodating space has a threaded section which extends toward the rear end wall which has a flange face in the accommodating space. In a pre-installed state, the spacer and a first pipe end with a first flare are accommodated in the nut, such that the spacer is held undetachable between the first flare and the internal thread. A second pipe end with a second flare can be held in the accommodating space by the screw, threaded into the nut such that the second flare is pressed against a sealing surface of the spacer and the spacer is pressed with a further sealing surface against the first flare.

11 Claims, 1 Drawing Sheet

(56) References Cited

U.S. PATENT DOCUMENTS

| | | | |
|---|---|---|---|
| 4,133,565 A | | 1/1979 | Shutt |
| 4,842,310 A | | 6/1989 | Muffke et al. |
| 5,129,689 A | * | 7/1992 | Newski et al. ............... 285/333 |
| 6,357,801 B1 | | 3/2002 | Takahashi et al. |
| 7,108,063 B2 | * | 9/2006 | Carstensen ............... 166/241.2 |
| 7,390,033 B2 | | 6/2008 | Weick et al. |

FOREIGN PATENT DOCUMENTS

| | | |
|---|---|---|
| EP | 1236946 | 9/2002 |
| JP | 07248079 | 9/1995 |

* cited by examiner

SCREW CONNECTION DEVICE FOR CONNECTING THE FLARED ENDS OF TWO PIPES

CROSS-REFERENCE TO RELATED APPLICATIONS

This patent application claims priority pursuant to Title 35 USC Section 119(e) to German Patent Application No. 20 2012 101 058.5 filed Mar. 23, 2012, the contents of which are hereby incorporated by reference herein.

BACKGROUND

The invention relates to a screw connection device for connecting the flared ends of two pipes.

Screw connection devices of the above mentioned type are known from practical application. In the process it has proven successful to provide one pipe end with an E flare and the other pipe end with an F flare. For the production of a fluid tight connection between the two pipe ends the E flare is pressed against the F flare. However, the disadvantage of the screw connection device known from practical application is that the flares can be damaged by being pressed too hard against one another and as a result the fluid tightness of the connection can no longer be guaranteed. In addition it is known to arrange a spacer or spacer ring between the flares. However, a spacer or spacer ring must be secured in a housing to make possible a reliable installation of the screw connection device in order to prevent the spacer from falling out prior to installation. This requires additional production steps which have a negative impact on the production costs of a screw connection device.

SUMMARY OF DISCLOSURE

It is the object of the invention to provide a screw connection or a screw connection device of the type mentioned in the introduction that is characterized by a reliable installability and easy producibility.

This object is met by a screw connection device according to the invention for connecting the flared ends of two pipes, comprising a screw, a nut and a spacer, wherein the nut exhibits a front end aperture, from which a preferably cylindrical accommodating space extends in the direction of a rear end aperture, wherein the accommodating space includes a threaded section, having an internal thread proceeding from the front end aperture in the direction of the rear end aperture to receive the screw in threaded relation and wherein the rear end aperture is arranged in a rear end front wall of the nut, exhibiting a flange face in the accommodating space, wherein the spacer is disposed in the accommodating space between the rear end front wall and the internal thread, and in a pre-installed state, the spacer and a first pipe end with a first flare can be accommodated, wherein a thread profile of the internal thread extends into the accommodating space designed such that in the pre-installed state, the spacer is held in the accommodating space between the first flare and the internal thread.

Within the scope of the invention a pre-installed state means that the screw is not screwed into the nut or is only partially screwed into the nut. In pre-installed state the screw especially preferably does not exert any contact pressure force on the second flare. In the installed state (connection state) means within the scope of the invention that the contact pressure force presses the second flare fluid tight on the spacer and the spacer is pressed fluid tight to the first flare. In the installed state a fluid medium, for example brake fluid, can flow from the first pipe to the second pipe or from the second pipe to the first pipe. The screw connection device can for example be used in brake systems or brake lines and/or fuel lines.

Front end aperture within the scope of the invention describes an insertion aperture in the nut, through which in advantageous manner the screw can be inserted or screwed with the second pipe into the accommodating space. The accommodating space is preferably designed in a cylindrical shape. The first pipe advantageously protrudes through the rear end aperture into the accommodating space, wherein the flare of the first pipe resides in the accommodating space. The first pipe end thus protrudes through the rear end aperture into the accommodating space of the nut. The first pipe and/or the second pipe are brake lines or fuel lines. The screw expediently exhibits an accommodation channel for accommodating the second pipe end. A front end of the screw around the second pipe end is designed within the scope of the invention as a press surface, with which said press surface the screw exerts the contact pressure on the second flare in the establishment of the installed state and in installed state. In the installed state the screw preferably is in non-positive contact with the press surface at the second flare. Advantageously an external thread is designed complementary to the internal thread of the nut.

The spacer exhibits within the scope of the invention a first sealing surface and a second sealing surface, wherein the first sealing surface is designed to be complementary to the flare of the first pipe end and the second sealing surface is designed to be complementary to the flare of the second pipe end. It is advisable to hold the spacer in particular in the pre-installed state undetachable in the accommodating space between the threaded section and the flange face or between the threaded section and the flare of the first pipe end.

Expediently the spacer is held in the accommodating space such that the spacer can be moved only in axial direction or longitudinal direction of the accommodating space. Axial direction or longitudinal direction means from the front end aperture to the rear end aperture. Preferably the spacer is guided in radial direction free from play. The radial direction is within the scope of the invention oriented perpendicular to the axial direction.

In accordance with one embodiment the threaded section of the accommodating space extends only over a portion of the axial length of the accommodating space. Advantageously a thread-free, preferably circular cylindrical section extends from the threaded section to the flange face. An axial length of the threaded section is preferably greater than an axial length of the thread-free section. The relation of the axial length of the threaded section to the axial length of the thread-free section advantageously ranges between 1.2 to 1.0 and 2.0 to 1.0, preferably 1.4 to 1.0 and 1.8 to 1.0 and especially preferably 1.6 to 1.0 or approximately 1.6 to 1.0. The spacer is in the pre-installed state especially preferably arranged in the thread-free section.

It is advisable to have the threaded section extend further into the accommodating space than the screw can be screwed into the nut for establishing the installed state. In this way it is ensured that the screw with the flared pipe end arranged in the accommodation channel of the screw can first be screwed into the nut without contact with the spacer, wherein the flare of the pipe end has no contact to the spacer. Thus screwing in the screw is possible first without a counter-pressure caused by a contact of the flare of the second pipe end on the spacer.

It has proven successful to have the spacer preferably designed to be circular cylindrical at least in sections. The external diameter of the spacer limited by an outer lateral surface is advantageously greater than the internal diameter of the threaded profile of the internal thread of the nut within the accommodating space. The axial length of the spacer 20 along the longitudinal axis 14 is less than the axial length of the thread-free section 13.

In accordance with an especially preferred embodiment the spacer exhibits an external thread which is designed complementary to the internal thread of the threaded section of the nut. It is advisable for establishing the pre-installed state to first have the first pipe arranged in the accommodating space such that the first flare is arranged especially preferably in the thread-free section. Expediently the spacer can be placed in the thread-free section of the accommodating space of the nut by first screwing the spacer into the threaded section of the nut, wherein a profiling of the external thread of the spacer engages in the profiling of the internal thread of the nut. The spacer is preferably screwed through the threaded section of the nut so that the spacer is brought into the thread-free section of the accommodating space.

In accordance with one preferred embodiment the spacer exhibits a radial flange which protrudes in the radial direction above the outer lateral surface of the spacer. The external diameter of the radial flange is advantageously greater than the internal diameter of the internal thread of the threaded section and/or greater than the external diameter of the spacer, which is determined by the lateral surface. Preferably an exterior of the flange, said exterior facing the internal surface of the accommodating space is designed in the form of a cylindrical surface.

Advantageously the radial flange projects in longitudinal direction of the spacer element centrally or approximately centrally from the lateral surface. Longitudinal direction of the spacer means from the first sealing surface to the second sealing surface, wherein the longitudinal direction of the spacer aligns with a longitudinal axis of the preferably circular cylindrical accommodating space. It has proven to be advantageous when the radial flange extends over 30 to 70% of the length of the spacer, advantageously over 40 to 60% of the length of the spacer and especially advantageously over 50% or approximately 50% of the length of the spacer. Length of the spacer means in longitudinal direction or in axial direction of the accommodating space when the spacer is accommodated in the accommodating space.

In accordance with one preferred embodiment the radial flange tapers proceeding from a base of the flange at the lateral surface of the spacer in the direction of the internal surface of the accommodating space. This shape prevents the spacer above all from canting in the event of an axial displacement, as a result of which no fluid tight connection between the spacer and the first flare and/or the second flare can be created.

Especially preferably the first flare of the first pipe end is designed as an F flare and/or the second flare of the second pipe end is designed as an F flare. The spacer advantageously exhibits two sealing surfaces, wherein the one sealing surface (second sealing surface) in installed state is in contact with the second flare and the further sealing surface (first sealing surface) in installed state is in contact with the first flare. The first sealing surface and/or the second sealing surface are each complementary to the first flare assigned to the first sealing surface and/or the second flare assigned to the second sealing surface. Basically it is possible to have one flare designed as an F flare and one flare designed as an E flare. In accordance with a further possible embodiment both flares are constructed as E flares.

The invention is based on the recognition that an inventive screw connection device is characterized by an easy installability and high functional reliability. It is essential that the spacer is also held reliably in the accommodating space in the non-installed state and that the possibility of an accidental loss of the spacer, for example during transportation, is ruled out. It is additionally essential that the securing of the spacer in the nut succeeds in surprisingly easy manner by providing only a partially threaded section in the accommodating space which extends further into the accommodating space of the nut than the screw is inserted into the nut in the installed state of the screw connection device but not entirely into the accommodating space. With the inventive screw connection device it is in addition ensured that a collapse of the flares is prevented in the event of screwing the screw into the nut. This collapse constitutes a plastic deformation of the flares, as a result of which a reliable fluid tight connection between the two pipe ends can no longer be ensured. The inventive device is thus characterized by considerable advantages.

DESCRIPTION OF DRAWINGS

Below the invention is explained in more detail by means of drawings which show examples of embodiments of the invention.

DETAILED DESCRIPTION

Figure 1:
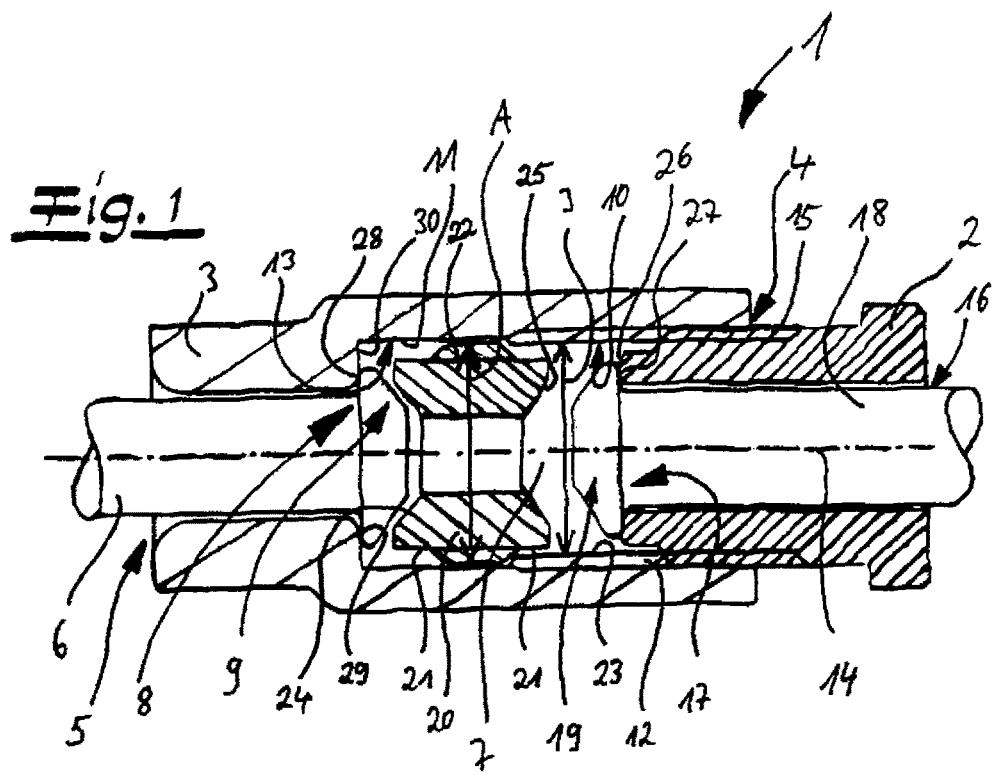
FIG. 1 shows an inventive screw connection device in the pre-installed state and FIG. 2 shows an inventive screw connection the installed state.

FIG. 1 shows a screw connection device 1 which comprises a screw 2 and a nut 3. The nut 3 has a front end aperture or insertion aperture 4 and a rear end aperture 5. A first pipe 6 is guided through the rear end aperture 5 into an accommodating space 7 of the nut 3. In accordance with the exemplary embodiment a first pipe end 8 of the first pipe 6 is designed as an F flare 9.

A threaded section 10 extends from the insertion aperture 4 in the direction of the rear end aperture 5, wherein an accommodation space internal surface 11 of the nut in the region of the threaded section 10 is equipped with an internal thread 12. A thread-free section 13 extends to the threaded section 10 from the rear end aperture 5, wherein the ratio of the axial length of the threaded section 10 to the axial length of the thread-free section 13 in the exemplary embodiment is 1.6 to 1.0. Length means an extent of the threaded section 10 or of the thread-free section 13 in the direction of a longitudinal axis 14 of the cylindrical designed accommodating space 7 in accordance with the exemplary embodiment.

The nut 3 exhibits an external thread 15 complementary to the internal thread 12 with which the screw 2 can be screwed into the nut 3. In accordance with the exemplary embodiment the nut 3 comprises an accommodation channel 16, through which a second pipe end 17 of a second pipe 18 is guided into the accommodating space 7 of the nut 3. The second pipe end 17 is designed as an F flare in accordance with the exemplary embodiment.

FIG. 1 shows that a spacer 20 is disposed in the accommodation space 7. In accordance with the exemplary embodiment the spacer 20 comprises a lateral surface 21 in the form of a cylindrical shape, upon which an external thread 22 is arranged. The spacer 20 has a sealing surface (first sealing surface) 24, designed to be complementary to the flare 9 of the first pipe 6. A sealing surface (second sealing surface) 25 of the spacer 20 is shaped complementary to the flare 19 of the second pipe 18.

In order to insert the spacer 20 into the thread-free section 13 of the accommodating space 7, the spacer 20 is first screwed into the nut 3, wherein the external thread 22 meshes with the internal thread 12 of the nut 3. The spacer 20 is rotated into the accommodating space 7 of the nut 3 until the external thread 22 of the spacer 20 disengages, or no longer meshes with the internal thread 12 of the nut 3. The spacer 20 is then accommodated with clearance or movably in the thread-free section 13 of the accommodating space 7.

FIG. 1 further shows that a profiling 23 of the internal thread 12 is designed such that the inside diameter "I" of the internal thread 12 is smaller than the outside diameter "A" of a profiling of the external thread 22 of the spacer 20. Due to the difference in the diameter of the external thread 22 and inside diameter of the internal thread 12, the spacer 20 inserted into the thread-free section 13 of the accommodating space 7 is safe from falling out of the accommodating space 7. In the pre-installed state presented in FIG. 1 the spacer 20 is held displacably in the accommodating space 7 due to the formation of the external thread 22 and of the internal thread 12. There is no fluid tight connection between the first pipe 6 and the second pipe 18 in the pre-installed state according to FIG. 1.

Figure 2:
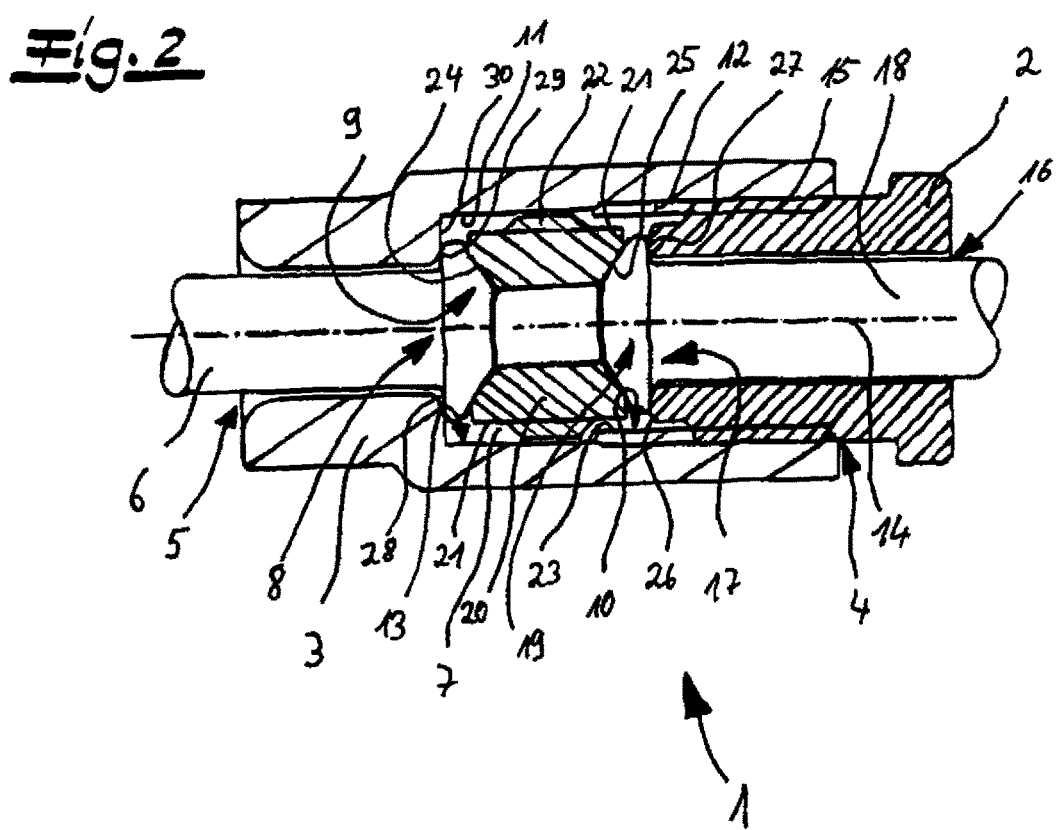

FIG. 2 shows the installed state of the screw connection device 1. The first flare 9 is in fluid tight contact with the first sealing surface 24 of the spacer 20. The second sealing surface 25 of the spacer is in fluid tight contact with the second flare 19 of the second pipe 18. The fluid tight contact of the flares 9, 19 with the spacer 20 is achieved by screwing the screw 2 into the nut 3. A front end press surface 26 of the screw 2 applies contact pressure force to a rear contact surface of the flare 19, as a result of which the flare 19 is pressed against the spacer 20 and the spacer 20 is pressed against the flare 9. According to FIG. 2 the flare 9 is in contact with a rear end contact surface 28 at a flange face 29 of the nut 3 in the accommodating space. In other respects the rear end aperture 5 of the nut 3 is arranged in the flange face 29, through which the first pipe 6 is guided into the accommodating space 7 in a rear end aperture 5 arranged in a rear end front wall 30 of the nut 3.

Furthermore FIG. 2 shows that the internal thread 12 of the threaded section 10 proceeds from the insertion aperture 4, extending further along the longitudinal axis 14 into the accommodating space 7 than the screw 2 can be screwed into the nut 3 in the installed state. In the exemplary embodiment the ratio of the length of the threaded section 10 to the length of the thread-free section 13 in the direction of the longitudinal axis 14 is 1.6 to 1.0.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

We claim:

1. A screw connection device for connecting the flared ends of two pipes, comprising a screw, a nut and a spacer, wherein said nut exhibits a front end aperture, from which a cylindrical accommodating space extends toward a rear end aperture, wherein said accommodating space includes a threaded section and a thread-free section, the threaded section comprising an internal thread proceeding from said front end aperture toward said rear end aperture to receive said screw in threaded relation, wherein said internal thread has an inside or minor diameter and an outer or major diameter, wherein said thread-free section has an inner diameter, and wherein said rear end aperture is formed in a rear end front wall of said nut exhibiting a flange face in said accommodating space, wherein said spacer is disposed in said accommodating space between said rear end front wall and said internal thread, and in a pre-installed state said spacer and a first pipe end with a flared end having a first flare can be accommodated, wherein a thread profile of said internal thread extends radially into said accommodating space such that, in the pre-installed state, said spacer is held in the accommodating space between said first flare and said internal thread;

wherein the spacer comprises a lateral surface in the form of a cylindrical shape and exhibits an external thread which is designed complementary to said internal thread, the external thread defining an outermost diameter of the spacer;

wherein said threaded section extends into said accommodating space so that the threaded section overlaps partially, in an installed state, the lateral surface of the spacer in an axial direction;

wherein the spacer is disposed between the first flared end of the first pipe and a second flared end of a second pipe;

wherein the spacer is held in the accommodating space by the internal thread when the external thread of the spacer is unthreaded from the internal thread, such that an axial movement of the spacer toward the front end aperture is blocked by the internal thread, where the outermost diameter of the external thread of the spacer is greater than the minor diameter of the internal thread;

wherein the extent of the inner diameter of said thread-free section is in the range between the extents of the minor diameter and the major diameter of said internal thread, wherein, based on the inner diameter of the thread-free section, a radially outermost surface of the spacer is limited from shifting radially beyond the major diameter of the internal thread.

2. A screw connection device according to claim 1, wherein, the second flared end of the second pipe includes a second flare that can be held in said screw, wherein by screwing said screw into said nut an installed state is produced, wherein said second flare in the installed state is pressed against a sealing surface of said spacer and said spacer is pressed with a further sealing surface against said first flare such that a rear side contact surface of said first flare is pressed against said flange face of said nut.

3. The screw connection according to claim 1, wherein said threaded section extends only over a portion of said axial length of said accommodating space.

4. The screw connection according to claim 1, wherein the thread-free section comprises a circular cylindrical section extending from said threaded section to said flange face.

5. The screw connection according to claim 1, wherein said threaded section extends longitudinally further into said accommodating space than said screw can be screwed into said nut for establishing the installed state.

6. The screw connection according to claim 1, wherein said spacer is designed to be circular cylindrical at least in portions thereof.

7. The screw connection according to claim 1, wherein said spacer exhibits a radial flange which protrudes in radial direction above the lateral surface of said spacer.

8. The screw connection according to claim 7, wherein said radial flange projects in longitudinal direction of said spacer element approximately centrally from said lateral surface.

9. The screw connection according to claim 8, wherein said radial flange tapers from a base at said lateral surface of said spacer in direction towards said internal surface of said accommodating space.

10. The screw connection according to claim 1, wherein said second pipe includes a flared end having a second flare, wherein said first flare of said first pipe is designed as an F flare or said second flare of said second pipe is designed as an F flare.

11. The screw connection device according to claim 1, wherein said spacer is held in said accommodating space such that said spacer can be moved only in an axial direction or longitudinal direction of the accommodating space.

* * * * *